(12) United States Patent
Arpin et al.

(10) Patent No.: US 9,923,218 B2
(45) Date of Patent: Mar. 20, 2018

(54) FUEL CELL ELECTROLYTE MANAGEMENT DEVICE

(71) Applicant: DOOSAN FUEL CELL AMERICA, INC., Atlanta, GA (US)

(72) Inventors: Kevin A. Arpin, Coventry, CT (US); William Bajorek, Cromwell, CT (US); Andrew Johnson, Gardner, MA (US); Sridhar Kanuri, Milford, CT (US); Eric Livaich, South Windsor, CT (US); Eric O'Brien, Tolland, CT (US); Timothy Patterson, West Hartford, CT (US)

(73) Assignee: DOOSAN FUEL CELL AMERICA, INC., Atlanta, GA (US)

( * ) Notice: Subject to any disclaimer, the term of this patent is extended or adjusted under 35 U.S.C. 154(b) by 196 days.

(21) Appl. No.: 14/969,253

(22) Filed: Dec. 15, 2015

(65) Prior Publication Data
US 2017/0170497 A1 Jun. 15, 2017

(51) Int. Cl.
*H01M 8/04276* (2016.01)
*H01M 8/086* (2016.01)

(52) U.S. Cl.
CPC ....... *H01M 8/04276* (2013.01); *H01M 8/086* (2013.01); *H01M 2300/0008* (2013.01)

(58) Field of Classification Search
None
See application file for complete search history.

(56) References Cited

U.S. PATENT DOCUMENTS

| | | | |
|---|---|---|---|
| 4,360,485 A | 11/1982 | Emanuelson et al. | |
| 4,450,212 A * | 5/1984 | Feigenbaum | C09K 3/12 427/115 |
| 4,588,661 A * | 5/1986 | Kaufman | H01M 8/0271 29/623.2 |
| 4,592,968 A | 6/1986 | Taylor | |
| 4,732,637 A * | 3/1988 | Dettling | H01M 8/0297 156/295 |
| 4,929,517 A | 5/1990 | Luoma et al. | |
| 5,300,124 A | 4/1994 | Breault et al. | |
| 5,366,825 A | 11/1994 | Breault et al. | |
| 5,563,003 A | 10/1996 | Suzuki et al. | |
| 6,197,442 B1 | 3/2001 | Gorman | |
| 7,727,422 B2 | 6/2010 | Horiuchi et al. | |
| 2003/0175573 A1 | 9/2003 | Yoo et al. | |

(Continued)

OTHER PUBLICATIONS

International Search Report and Written Opinion for PCT Application No. PCT/US2016/059625 dated Jan. 31, 2017.

*Primary Examiner* — Lucas J. O'Donnell
(74) *Attorney, Agent, or Firm* — Carlson, Gaskey & Olds

(57) ABSTRACT

An illustrative example fuel cell electrolyte management device includes a first component having a first density and a second component having a second density that is less than the first density. The first component has a first side including a pocket and a second side facing opposite the first side. The second side of the first component includes a first plurality of fluid flow channels. The second component has a porosity configured for storing electrolyte in the second component. The second component fits within the pocket. The second component has a first side received directly against the first side of the first component. The second component has a second side including a second plurality of fluid flow channels.

25 Claims, 2 Drawing Sheets

(56) References Cited

U.S. PATENT DOCUMENTS

| | | |
|---|---|---|
| 2003/0186107 A1 | 10/2003 | Maston et al. |
| 2008/0057373 A1 | 3/2008 | Breault et al. |
| 2011/0177419 A1* | 7/2011 | Luoma ................ H01M 8/0213 429/457 |
| 2012/0028160 A1 | 2/2012 | Kanuri et al. |

* cited by examiner

FUEL CELL ELECTROLYTE MANAGEMENT DEVICE

TECHNICAL FIELD

The present disclosure relates to storing an electrolyte, such as phosphoric acid, in a fuel cell.

BACKGROUND

Fuel cells are useful for generating electrical energy based on an electrochemical reaction involving hydrogen and oxygen. There are several types of fuel cell including polymer electrolyte membrane (PEM) fuel cells and phosphoric acid fuel cells (PAFC). Providing and maintaining a sufficient amount of phosphoric acid, which serves as a liquid electrolyte, is one of the issues associated with PAFCs. Once the phosphoric acid evaporates, the PAFC fails so extending the time during which the PAFC has sufficient phosphoric acid increases the useful lifetime of the PAFC.

Some known PAFCs include an uncatalyzed condensation zone on the cathode and anode substrates where evaporating phosphoric acid may be captured. While such condensation zones have some use in this regard, they reduce the area of the electrode substrates that is available for the electrochemical reaction and, consequently, reduce the electrical output capacity of the PAFC.

Some proposed fuel cell configurations include a bipolar plate with a porous layer that may store some phosphoric acid. Such arrangements typically include a solid separator plate against the porous layer to prevent acid migration in between cells. While such separator plates are useful for that purpose they introduce other issues. For example, thermal and electrical transport between cells of a fuel cell stack assembly should be maximized but a solid separator plate tends to reduce thermal and electrical conductivities. Another limiting factor has been that previous techniques for manufacturing such separator plates are expensive. Adding such a plate to each cell increases cost for a cell stack assembly or power plant that includes many cells.

There is a need for improvements in the way in which phosphoric acid is maintained in a PAFC.

SUMMARY

An illustrative example fuel cell electrolyte management device includes a first component having a first density and a second component having a second density that is less than the first density. The first component has a first side including a pocket and a second side facing opposite the first side. The second side of the first component includes a first plurality of fluid flow channels. The second component has a porosity configured for storing electrolyte in the second component. The second component fits within the pocket. The second component has a first side received directly against the first side of the first component. The second component has a second side including a second plurality of fluid flow channels.

In an example embodiment of a device having one or more features of the device of the previous paragraph, the first component comprises a first type of graphite and a first type of resin and the second component comprises a second type of graphite that is different from the first type of graphite and a second type of resin that is different from the first type or resin.

In an example embodiment of a device having one or more features of the device of either of the previous paragraphs, the first type of graphite comprises at least graphite flakes and the second type of graphite comprises at least non-flake graphite.

In an example embodiment of a device having one or more features of the device of any of the previous paragraphs, the first resin comprises a fluoropolymer resin and the second resin comprises a thermosetting polymeric resin.

In an example embodiment of a device having one or more features of the device of any of the previous paragraphs, the fluoropolymer resin is between 10% and 50% by weight of the first component.

In an example embodiment of a device having one or more features of the device of any of the previous paragraphs, the second component is at least temporarily bonded to the pocket by an adhesive that decomposes at a temperature above an ambient or room temperature.

In an example embodiment of a device having one or more features of the device of any of the previous paragraphs, the second component is at least temporarily bonded to the pocket by an adhesive that is situated along a border of the pocket.

In an example embodiment of a device having one or more features of the device of any of the previous paragraphs, the first density is at least 2 $gm/cm^3$.

In an example embodiment of a device having one or more features of the device of any of the previous paragraphs, the first density is effective as a barrier to prevent acid migration through the first component.

In an example embodiment of a device having one or more features of the device of any of the previous paragraphs, the device has a through plane electrical resistivity that is less than 0.0017 mVmill at approximately 100 psi axial load and 100 ASF; and a through plane thermal conductivity that is greater than 7 W/mK and less than 12 W/mK at approximately 140 psi.

In an example embodiment of a device having one or more features of the device of any of the previous paragraphs, the second component is between 30% and 75% porous.

In an example embodiment of a phosphoric acid management device having one or more features of the device of any of the previous paragraphs, pores of the second component have a size between 3 microns and 20 microns.

In an example embodiment of a device having one or more features of the device of any of the previous paragraphs, the first component includes a rib on each of at least two edges of the pocket; the ribs have a height; the second component has a thickness in a direction between the first and second sides of the second component; and the height is approximately equal to the thickness.

In an example embodiment of a device having one or more features of the device of any of the previous paragraphs, the first component includes a rib on each of at least two edges of the pocket; the ribs are parallel to the second plurality of fluid flow channels; and a seal member is situated on each of the ribs.

In an example embodiment of a device having one or more features of the device of any of the previous paragraphs, each seal member includes a flap portion extending laterally outward beyond an edge of the corresponding rib.

In an example embodiment of a device having one or more features of the device of any of the previous paragraphs, the first plurality of fluid flow channels are generally perpendicular to the ribs; a first component seal member is situated on each laterally outermost edge of the second side of the first component; and the first component seal members are parallel to the first plurality of fluid flow channels.

An illustrative example method of making a fuel cell electrolyte management device includes forming a first component from a first mixture comprising a first type of graphite and a first resin, the first component having a first density; providing the first component with a pocket on a first side of the first component; forming a second component from a second mixture comprising a second type of graphite and a second resin, the second component having a second density that is less than the first density, the second component having a porosity that is configured to store electrolyte in the second component; situating the second component in the pocket with a first side of the second component received directly against the first side of the first component; and providing fluid flow channels on each of the first component and the second component.

In an example embodiment of a method having one or more features of the method of the previous paragraph, forming the first component comprises pressing the first mixture into a first preform using a pressure of 4000 psi at ambient temperature; subsequently pressing the preform using a pressure of 800 psi at a temperature of 550° F. for about an hour; subsequently pressing the preform using a pressure of 800 psi at a temperature of 140° F. for about an hour; and forming the second component comprises pressing the second mixture into a second preform using a pressure of 200 psi at 180° C. for about 30 minutes; and subsequently converting the second resin to carbon by heating the second preform at a temperature of about 900° C. while the second preform is exposed to an inert gas.

In an example embodiment of a method having one or more features of the method of any of the previous paragraphs, providing the first component with the pocket comprises at least one of machining a portion of the first component away to establish the pocket; or forming the pocket during the forming of the first component.

In an example embodiment of a method having one or more features of the method of any of the previous paragraphs, the first density is at least 2 gm/cm$^3$; and the second component is between 30% and 75% porous.

An example embodiment of a method having one or more features of the method of any of the previous paragraphs includes at least temporarily bonding the second component to the pocket by an adhesive that decomposes at a temperature above an ambient or room temperature.

An example embodiment of a method having one or more features of the method of any of the previous paragraphs includes placing an adhesive along a border of the pocket; and at least temporarily bonding the second component to the pocket using the adhesive.

In an example embodiment of a method having one or more features of the method of any of the previous paragraphs, the second mixture comprises a wax that vaporizes at an elevated temperature; and the second component has pores in locations occupied by the wax prior to the wax vaporizing.

In an example embodiment of a method having one or more features of the method of any of the previous paragraphs, the device has a through plane electrical resistivity that is less than 0.0017 mVmill at 100 psi axial load and 100 ASF; and a through plane thermal conductivity that is greater than 7 W/mK and less than 12 W/mK at approximately 140 psi.

In an example embodiment of a method having one or more features of the method of any of the previous paragraphs, the first mixture comprises about 85% flake graphite and about 15% fluoropolymer resin by mass; and the second mixture comprises about 80% non-flake graphite and about 20% thermosetting polymeric resin by mass.

Various features and advantages associated with embodiments of this invention will become apparent to those skilled in the art from the following detailed description. The drawings that accompany the detailed description can be briefly described as follows.

DETAILED DESCRIPTION

Figure 1:
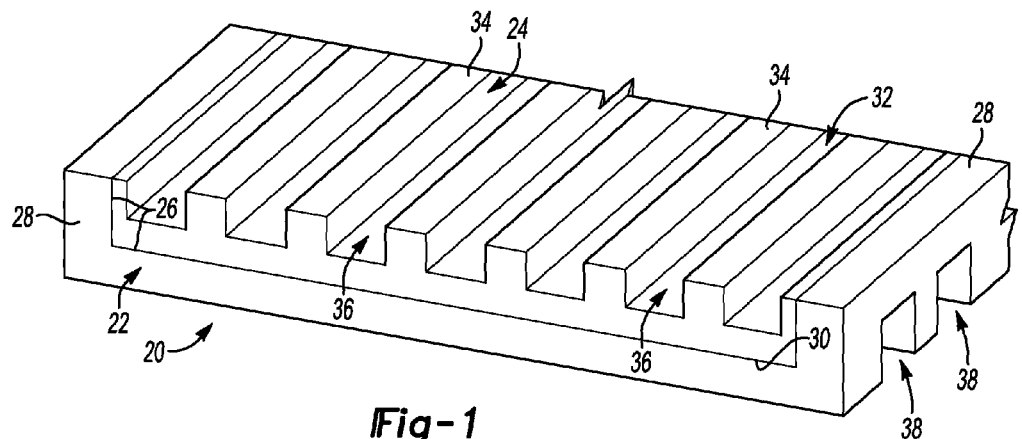
FIG. 1 diagrammatically illustrates an example embodiment of a fuel cell electrolyte management device designed according to an embodiment of this invention
Figure 2:
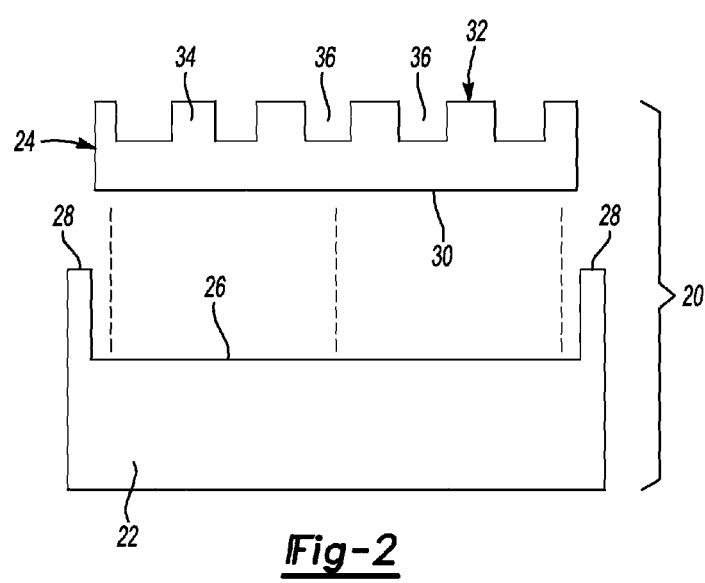
FIG. 2 is an exploded view of the example embodiment shown in FIG. 1.

FIGS. 1 and 2 illustrate an example fuel cell electrolyte management device 20 that is useful for facilitating operation of a fuel cell and maintaining useful levels of electrolyte within the fuel cell. One example electrolyte is phosphoric acid. For discussion purposes, phosphoric acid is referred to in the following description as an example electrolyte that is useful within a fuel cell. Other electrolytes may be included in a device or fuel cell designed according to an embodiment of this invention.

The example device 20 includes a first component 22 and a second component 24 that is received within a pocket 26 on the first component 22. In this example, the first component 22 includes raised edges or beams 28 on opposite sides of the pocket 26.

A first side 30 of the second component 24 is received against the first component 22 and a second side 32 of the second component 24 faces in an opposite direction from the first side 30. In some embodiments, the first side 30 is adhesively secured to the pocket 26 by an adhesive that breaks down at an elevated temperature, such as a fuel cell operating temperature. In some examples the adhesive breaks down at temperatures that exceed a room temperature or ambient temperature conditions. The device 20 will be positioned within a fuel cell stack in a manner that there is no risk of separation between the first component 22 and the second component 24 so the adhesive used to secure the second component 24 within the pocket 26 is only needed during assembly or handling of the components of the device 20. The adhesive need not hold the second component in place during fuel cell operation. One feature of including an adhesive that breaks down at a fuel cell operating temperature is that it removes any material between the first component 22 and the second component 24 at the interface between those two components where the side 30 of the second component 24 is received against the surface of the pocket 26.

Some embodiments include an adhesive that breaks down at temperatures above the room or ambient temperatures expected during manufacturing or assembly of the device. Such adhesives may break down at temperatures that are lower than an expected fuel cell operating temperature but still provide any desired adhesive bond prior to the device 20 being incorporated into a cell stack assembly.

Having the material of the first component 22 and second component 24 immediately adjacent each other without any intervening layers or materials enhances electrical and thermal conductivity of the device 20. Maximizing or improving electrical and thermal conductivity provides enhanced fuel cell output and performance.

The second side 32 of the second component 24 includes a plurality of ribs 34 and fluid flow channels 36 that are useful for distributing or supplying fuel to an anode electrode within a fuel cell. The first component 22 includes fluid flow channels 38 that are useful for supplying an oxidant to a cathode electrode, for example.

The first component 22 and the second component 24 have different densities and different porosities giving the device 20 a dual nature or capacity. The first component 22 has a higher density and is less porous than the second component 24. The lower density and higher porosity of the second component 24 renders it suitable as a phosphoric acid storage region or component within a fuel cell. The first component 22 is essentially fully dense and non-porous or essentially non-porous to prevent any acid migration between cells within a cell stack assembly.

The amount of phosphoric acid that may be stored in the second component 24 will vary with the porosity of that component. The porosity of the second component 24 may range between 30% and 75%. Increased porosity introduces challenges in handling the second component 24 during the manufacturing and assembly processes mentioned above. A desired porosity range for an example embodiment is between 30% and 60%.

Example pore sizes range from about 3 μm to about 20 μm. The pore size in the illustrated example is selected to be larger than the pore size of the matrix but smaller than the pore size of a gas diffusion layer. Maintaining a pore size within these parameters prevents the matrix from losing electrolyte, which could be the result of a loss of bubble pressure, and prevents the gas diffusion layer from flooding, which could result in fuel or air starvation.

One example includes a wettability treatment for the second component 24 to improve acid filling of the pores within the second component 24. Example wettability treatments include acid treatment, oxygen plasma, or coating at least portions of the second component 24 with wetable nanoparticles.

In one example, the first component 22 has a density that is at least 2.1 grams per cubic centimeter. The density of the first component 22 provides an acid migration rate that is less than 0.1 mm for every 100,000 hours of fuel cell operation. Some embodiments include an acid migration rate between 0.1 and 0.7 mm for every 100,000 hours of fuel cell operation. Some embodiments include an acid migration rate of 0.5 mm per 100 hours of operation.

The materials selected for making the first component 22 and the second component 24 are stable in the presence of hot phosphoric acid at temperatures around 200° C., which is typical during operation of a phosphoric acid fuel cell.

In some embodiments, different material compositions of the first component 22 and the second component 24 yield the desired characteristics of those components. For example, the second component 24 comprises one type of graphite while the first component 22 comprises another type of graphite. The second component 24 may comprise spherical graphite, flake graphite, or arbitrarily shaped non-flake graphite. The first component 22 may comprise flake graphite.

Some example embodiments include a material for making the second component 24 that establishes pores within the material upon heating the material. For example, a wax or similar material may be included as a component in the mixture for forming the second component 24. At an appropriate temperature the wax or other component melts leaving pores within the remaining material of the second component. One example includes mixing about 20% synthetic wax powder, 20% phenolic resin powder, and 60% graphite powder. That mixture is used to form the second component 24. The wax completely vaporizes during a heat treatment step, creating a higher porosity plate than can be achieved with phenolic resin alone. Other examples of pore forming materials are polyethylene wax, PEG (polyethylene glycol) and cellulose powder. The wax or other material may constitute about 5-30% by weight, phenolic resin may range from 10-25% by weight with the balance comprising graphite powder.

Figure 3:
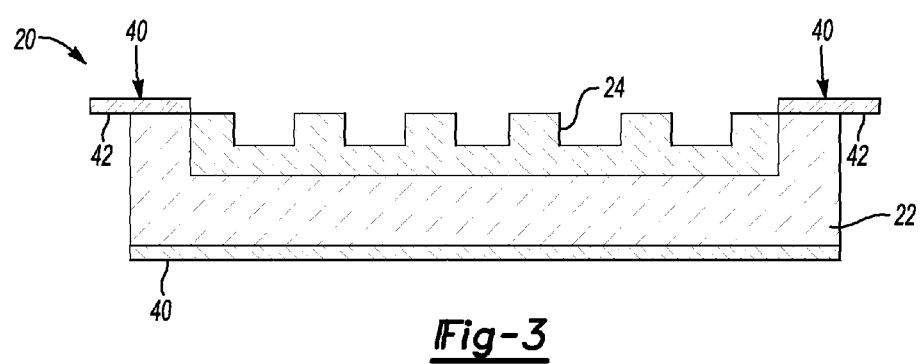
FIG. 3 schematically illustrates selected features of an example embodiment designed according to this invention.

FIG. 3 schematically illustrates the different densities and porosities of the first component 22 and the second component 24. Another feature included in the illustration of FIG. 3 is a plurality of seals 40 along edges of the first component 22. The seals 40 are situated parallel to the fluid flow channels and provide an acid barrier that prevents migration of acid from cell to cell. In this example, extending flaps 42 are situated beyond the outside edge of the first component 22 as can be appreciated within FIG. 3. The seal 40 shown at the bottom of FIG. 3 extends further out of the page than the corresponding edge of the bottom of the first component 22. The seals 40 also prevent gas diffusion between cells.

The higher density of the first component 22 and the seals 40 provide an effective acid barrier and gas diffusion barrier so that a distinct separator plate is not required between the components 22 and 24. The example device 20 may be used in place of a known bipolar plate within a phosphoric acid fuel cell. Previous bipolar plate designs capable of storing acid included solid separator plates and their inclusion tends to reduce the electrical conductivity and electrical productivity of a cell stack assembly. One feature of eliminating the need for a separator plate, which is typically solid and interposed between the anode and cathode flow fields, is that thermal and electrical conductivity may increase because of the direct contact between the materials of the first component 22 and the second component 24. The illustrated device, therefore, provides enhancements in phosphoric acid storage and electrical conductivity and electrical production for a fuel cell.

The example device 20 has a through plane thermal conductivity between 7 W/mK and 12 W/mK as measured for a 6"×6" sample at 139 psi. The in-plane thermal conductivity is less than 111 W/mK. The electrical conductivity of an example device 20 is less than 0.0017 mVmill for a 6"×6" sample measured at 100 psi axial load and 100 ASF.

Another feature of the storage aspect of the less dense, more porous second component 24 of the example embodiment is that it reduces or eliminates a need for the condensation zones that have been provided in some PAFCS for purposes of attempting to increase the longevity of the fuel cell by maintaining more phosphoric acid within the cell stack assembly. The phosphoric acid storage capacity of the second component 24 reduces a need for a condensation zone.

Eliminating a condensation zone increases the surface area that is useful for the electrochemical, energy-producing reaction of the fuel cell. This is another way in which the example embodiment enhances fuel cell productivity.

Figure 4:
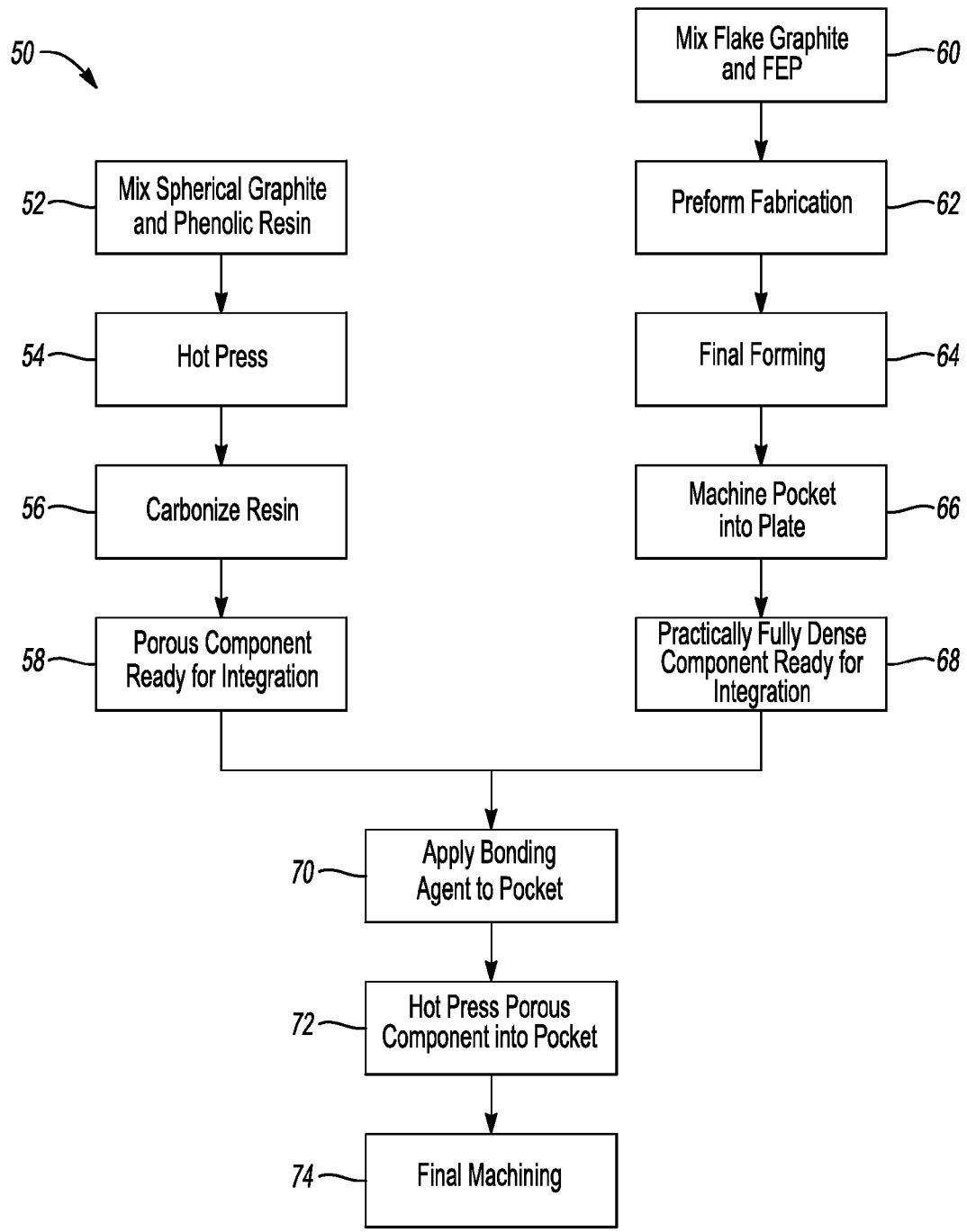
FIG. 4 is a flow chart diagram that summarizes an example process of making a device according to an embodiment of this invention.

FIG. 4 is a flowchart diagram 50 that schematically summarizes an example process of making a phosphoric acid management device according to an embodiment of this invention. A process for making the second component 24 begins at 52 where a selected type of graphite is mixed with a selected resin. An example mixture includes eighty percent graphite and eighteen percent resin by mass. For purposes of discussion, FIG. 4 includes utilizing spherical graphite and phenolic resin. An example embodiment includes phenolic resin, petroleum pitch and furfuryl alcohol.

At 54, the graphite resin mixture is pressed into a flat plate configuration at an elevated temperature sufficient to cure the resin. One example includes utilizing 200 psi at a temperature of 180° C. for approximately thirty minutes. At 56, the resin of the graphite/resin mixture is converted to carbon at an elevated temperature, such as 900° C. in an inert atmosphere (e.g., nitrogen or argon).

At 56, the resin is carbonized in the illustrated example. In another example embodiment, the resin is graphitized by annealing the porous plate that becomes the second component 24 at a temperature above 900° C. If graphitization of the resin is achieved, the performance of the device 20 and the associated fuel cell may be enhanced. Using an increased temperature for graphitization instead of carbonization, however, may introduce additional cost during the manufacturing process, which may outweigh the benefit of any enhancement to performance.

At 58, the less dense, porous, phosphoric acid storing second component 24 is prepared for integration into the device 20. In some example embodiments, a continuous process is used for making the two components of the device 20. A preform for the second component 24 may be made with a larger surface area than is needed for an individual fuel cell (larger in width, length or both). That preform may be cut down into appropriate sizes for one or more of the devices 20. Some examples include establishing long strips of material for at least one of the components 22, 24 having a width corresponding to the desired final width of the corresponding component. Then individual sections can be cut to a desired length. Using such a continuous process may increase the economies associated with a device designed according to an embodiment of this invention.

The first component 22 is made using a process that begins at 60 where flake graphite is mixed with a fluoropolymer resin. In one example, the resin is a copolymer fluorinated ethylene propylene resin. One example includes using a mixture of 85% graphite and 15% resin by mass. The preform fabrication at 62 establishes a flat plate structure by pressing the mixture into a preform at 4000 psi at room temperature. At 64, the preform is pressed at 800 psi at a temperature of 550° F. for approximately sixty minutes. Subsequently, the preform is pressed at 800 psi and 140° F. for approximately sixty minutes.

At 66, the pocket 26 is established on the first component 22. In this example, the pocket is established by machining out material from the preform established in the preceding portions of the schematically illustrated method. In other embodiments, a mold-to-shape approach may be used when manufacturing at least the first component 22. At 68, the dense, essentially non-porous first component 22 is ready for assembly.

At 70, a bonding agent or adhesive is applied to the pocket 26. As mentioned above, reducing the amount of adhesive used facilitates maintaining an electrical conductivity between the components 22 and 24 that is as high as possible. One example includes applying the bonding agent only around the perimeter of the pocket 26.

At 72, the first component 24 is situated within the pocket 26 and then the adhesive is cured at 100 psi and 200° F. for approximately a minute.

The adhesive used during the manufacturing process should provide a sufficient bond between the components to hold them together during the machining at 74 and during the process of stacking individual fuel cell units together within a cell stack assembly. One example adhesive is commercially available from 3M and is known by the product designation 4213NF. The disclosed example embodiment utilizes a bonding agent for temporarily securing the second component 24 within the pocket 26. As mentioned above, once the device 20 is situated within a fuel cell stack, the compressive forces associated with that stack hold the components in place relative to each other so that the bonding properties of the adhesive are no longer necessary. Using a bonding agent that decomposes at an elevated temperature, such as a fuel cell operation temperature (approximately 200° C.) or another temperature above room or ambient temperature, provides a satisfactory bond for the manufacturing and assembly process that does not subsequently interfere with or reduce the electrical and thermal conductivity within a fuel cell, which otherwise may exist if the bonding agent has poor electrical and thermal conductivity properties.

While an adhesive is used to at least temporarily secure the second component 24 within the pocket 26, some example embodiments do not have such an adhesive. The manner in which the first component 22 and second component 24 are manufactured may dictate whether an adhesive is used. For example, when the fluid flow channels 38 and 36 are machined into the device 20 after the second component 24 has been placed within the pocket 26, adhesive may be needed to facilitate the machining process. If the fluid flow channels are pre-established in the components before the second component 24 is placed within the pocket 26, then an adhesive may not be necessary because the components may be assembled as part of a process for making a cell stack assembly and the eventual pressure applied to the stack will hold the components together.

A final machining process is shown at 74 which, in this example, is used for establishing the flow field channels on opposite sides of the device by machining away the material where the channels should exist.

Although machining is used in the described example embodiment, the mold shape used for establishing the first component 22, the second component 24, or both, could be configured to establish the pocket 26 in the first component 22, the fluid flow channels in either component, or a combination of these.

One feature of the example device 20 is that it provides electrolyte storage capability within a fuel cell that does not require a separate solid separator plate layer to prevent mixing of gases and electrolyte between cells. The illustrated example also does not require a wet seal to prevent gas mixing. Instead, the first component 22, which is significantly more dense than the second component 24 prevents electrolyte migration between cells and mixing of gases between cells.

The disclosed example device and method provide enhanced electrolyte management within a fuel cell. Additional electrolyte storage is possible without sacrificing electrical performance, but instead enhanced electrical performance of a fuel cell becomes possible.

The preceding description is illustrative rather than limiting in nature. Variations and modifications to the disclosed examples may become apparent to those skilled in the art that do not necessarily depart from the essence of the contribution to the art provided by the disclosed embodi-

We claim:

1. A fuel cell electrolyte management device, comprising:
a first component having a first density, the first component having a first side including a pocket and a second side facing opposite the first side, the second side including a first plurality of fluid flow channels; and
a second component having a second density that is lower than the first density, the second component having a porosity configured for storing electrolyte in the second component, the second component fitting within the pocket, the second component having a first side received directly against the first side of the first component, the second component having a second side including a second plurality of fluid flow channels.

2. The device of claim 1, wherein
the first component comprises a first type of graphite and a first type of resin; and
the second component comprises a second type of graphite that is different from the first type of graphite and a second type of resin that is different from the first type or resin.

3. The device of claim 2, wherein
the first type of graphite comprises at least graphite flakes; and
the second type of graphite comprises at least non-flake graphite.

4. The device of claim 2, wherein
the first resin comprises a fluoropolymer resin; and
the second resin comprises a thermosetting polymeric resin.

5. The device of claim 4, wherein the fluoropolymer resin is between 10% and 50% by weight of the first component.

6. The device of claim 1, wherein the second component is at least temporarily bonded to the pocket by an adhesive that decomposes at a temperature above an ambient or room temperature.

7. The device of claim 1, wherein the second component is at least temporarily bonded to the pocket by an adhesive that is situated along a border of the pocket.

8. The device of claim 6, wherein the first density is at least 2 gm/cm$^3$.

9. The device of claim 1, wherein the first density is effective as a barrier to prevent electrolyte migration through the first component.

10. The device of claim 1, wherein
the device has a through plane electrical resistivity that is less than 0.0017 mVmill at approximately 100 psi axial load and 100 ASF; and
a through plane thermal conductivity that is greater than 7 W/mK and less than 12 W/mK at approximately 140 psi.

11. The device of claim 1, wherein the second component is between 30% and 75% porous.

12. The device of claim 1, wherein pores of the second component have a size between 3 microns and 20 microns.

13. The device of claim 1, wherein
the first component includes a rib on each of at least two edges of the pocket;
the ribs have a height;
the second component has a thickness in a direction between the first and second sides of the second component; and
the height is approximately equal to the thickness.

14. The device of claim 1, wherein
the first component includes a rib on each of two edges of the pocket;
the ribs are parallel to the second plurality of fluid flow channels; and
a seal member is situated on each of the ribs.

15. The device of claim 14, wherein each seal member includes a flap portion extending laterally outward beyond an edge of the corresponding rib.

16. The device of claim 14, wherein
the first plurality of fluid flow channels are generally perpendicular to the ribs;
a first component seal member is situated on each laterally outermost edge of the second side of the first component; and
the first component seal members are parallel to the first plurality of fluid flow channels.

17. A method of making a fuel cell electrolyte management device, the method comprising:
forming a first component from a first mixture comprising a first type of graphite and a first resin, the first component having a first density;
providing the first component with a pocket on a first side of the first component;
forming a second component from a second mixture comprising a second type of graphite and a second resin, the second component having a second density that is less than the first density, the second component having a porosity that is configured to store electrolyte in the second component;
situating the second component in the pocket with a first side of the second component received directly against the first side of the first component; and
providing fluid flow channels on each of the first component and the second component.

18. The method of claim 17, wherein
forming the first component comprises
pressing the first mixture into a first preform using a pressure of 4000 psi at ambient temperature;
subsequently pressing the preform using a pressure of 800 psi at a temperature of 550° F. for about an hour;
subsequently pressing the preform using a pressure of 800 psi at a temperature of 140° F. for about an hour; and
forming the second component comprises
pressing the second mixture into a second preform using a pressure of 200 psi at 180° C. for about 30 minutes; and
subsequently converting the second resin to carbon by heating the second preform at a temperature of about 900° C. while the second preform is exposed to an inert gas.

19. The method of claim 17, wherein
providing the first component with the pocket comprises at least one of
machining a portion of the first component away to establish the pocket; or
forming the pocket during the forming of the first component.

20. The method of claim 17, wherein
the first density is at least 2 gm/cm$^3$; and
the second component is between 30% and 75% porous.

21. The method of claim 17, comprising
at least temporarily bonding the second component to the pocket by an adhesive that decomposes at a temperature above an ambient or room temperature.

22. The method of claim 17, comprising
placing an adhesive along a border of the pocket; and
at least temporarily bonding the second component to the pocket using the adhesive.
23. The method of claim 17, wherein
the second mixture comprises a wax that vaporizes at an elevated temperature; and
the second component has pores in locations occupied by the wax prior to the wax vaporizing.
24. The method of claim 17, wherein
the device has a through plane electrical resistivity that is less than 0.0017 mVmill at 100 psi axial load and 100 ASF; and
a through plane thermal conductivity that is greater than 7 W/mK and less than 12 W/mK at approximately 140 psi.
25. The method of claim 17, wherein
the first mixture comprises about 85% flake graphite and about 15% fluoropolymer resin by mass; and
the second mixture comprises about 80% non-flake graphite and about 20% thermosetting polymeric resin by mass.

\* \* \* \* \*